US008608561B2

United States Patent
Yamada et al.

(10) Patent No.: US 8,608,561 B2
(45) Date of Patent: Dec. 17, 2013

(54) COMPUTER-READABLE STORAGE MEDIUM HAVING OBJECT CONTROL PROGRAM STORED THEREIN AND OBJECT CONTROL APPARATUS

(75) Inventors: Yoichi Yamada, Kyoto (JP); Shirou Mouri, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 432 days.

(21) Appl. No.: 12/649,865

(22) Filed: Dec. 30, 2009

(65) Prior Publication Data

US 2011/0105228 A1    May 5, 2011

(30) Foreign Application Priority Data

Oct. 30, 2009    (JP) .................................. 2009-250672

(51) Int. Cl.
*A63F 9/24*    (2006.01)

(52) U.S. Cl.
USPC ................. 463/31; 463/32; 463/37; 345/158; 345/704; 345/419

(58) Field of Classification Search
USPC ................. 463/31, 32, 37; 345/158, 204, 419
See application file for complete search history.

(56) References Cited

U.S. PATENT DOCUMENTS

| 6,267,676 | B1 * | 7/2001 | Nagaoka ......................... 463/43 |
| 7,322,889 | B2 * | 1/2008 | Ueshima ......................... 463/34 |
| 7,651,396 | B2 * | 1/2010 | Takahashi ....................... 463/30 |
| 7,785,199 | B2 * | 8/2010 | Nishimura et al. ............. 463/31 |
| 7,785,200 | B2 * | 8/2010 | Nakajima ........................ 463/33 |
| 7,843,429 | B2 * | 11/2010 | Pryor ............................. 345/158 |
| 2005/0159197 | A1 | 7/2005 | Tawara |
| 2005/0221893 | A1 | 10/2005 | Ohta |
| 2006/0252540 | A1 | 11/2006 | Kando et al. |
| 2007/0265086 | A1 | 11/2007 | Aoyagi et al. |
| 2008/0234045 | A1 * | 9/2008 | Mezen ............................. 463/37 |
| 2009/0051758 | A1 * | 2/2009 | Endo et al. ...................... 348/53 |
| 2009/0143141 | A1 | 6/2009 | Wells et al. |
| 2010/0022304 | A1 * | 1/2010 | Katayama et al. .............. 463/31 |
| 2010/0261526 | A1 * | 10/2010 | Anderson et al. ............... 463/31 |

OTHER PUBLICATIONS

"Command & Conquer", Westwood Studios Inc. 1998, pp. 1-89, http://pnmedia.gamespy.com/planetcnc.gamespy.com/features/keymaps/TD/manual.pdf.
"The Legend of Zelda: Phantom Hourglass—Instruction Booklet", pp. 1-18, 2007, http://www.nintendo.com/consumer/gameslist/manuals/DS_Zelda_Phantom_Hourglass.pdf.
Morrison, "Sams Teach Yourself Game Programming in 24 Hours", 9 pages, Dec. 24, 2002, Sams Publishing.

(Continued)

*Primary Examiner* — Arthur O. Hall
*Assistant Examiner* — Shahid Kamal
(74) *Attorney, Agent, or Firm* — Nixon & Vanderhye PC

(57) ABSTRACT

When a game apparatus detects a double-touch in an area other than an area where an enemy character is displayed, the game apparatus causes a player character to perform a forward roll motion. On the other hand, when the game apparatus detects a touch operation onto the enemy character, a prohibition area is provided at a position of the enemy character. When the game apparatus detects a touch onto the prohibition area, even if the touch operation is the double-touch, the game apparatus prohibits the player character from performing the forward roll motion and causes the player character to attack the enemy character.

18 Claims, 12 Drawing Sheets

(56) References Cited

OTHER PUBLICATIONS

"World of Warcraft", Blizzard Entertainment, pp. 1-44, 2004, http://willishome.com/Manual.pdf.

"The Legend of Zelda: Phantom Hourglass, Operating Instructions", Nintendo Co., Ltd., Jun. 23, 2007, 6 page.

A One Office K.K., Nintendo GameCube Books, Sonic Adventure DX Complete Guide, Softbank Publishing K.K., Jul. 31, 2003, pp. 119-120—(partial translation).

"Puppet Guardian [Game Guide]—Operation Guide" [online], May 13, 2007, [searched on Mar. 6, 2013] http://web.archive.org/web/20070513110403/http://artifact.jp/guardian/guide/guide02.php, (partial translation).

"[ZenepicOnline] Operating Method" [online], Feb. 3, 2008, [searched on Mar. 6, 2013], http://web.archive.org/web/20080203102109/http://www.xenepiconline.info/playguide/manual/move.html (partial translation).

Notice of Reasons for Rejection for Japanese Patent Application No. 2009-250672, dated Mar. 12, 2013.

* cited by examiner

F I G. 1 0
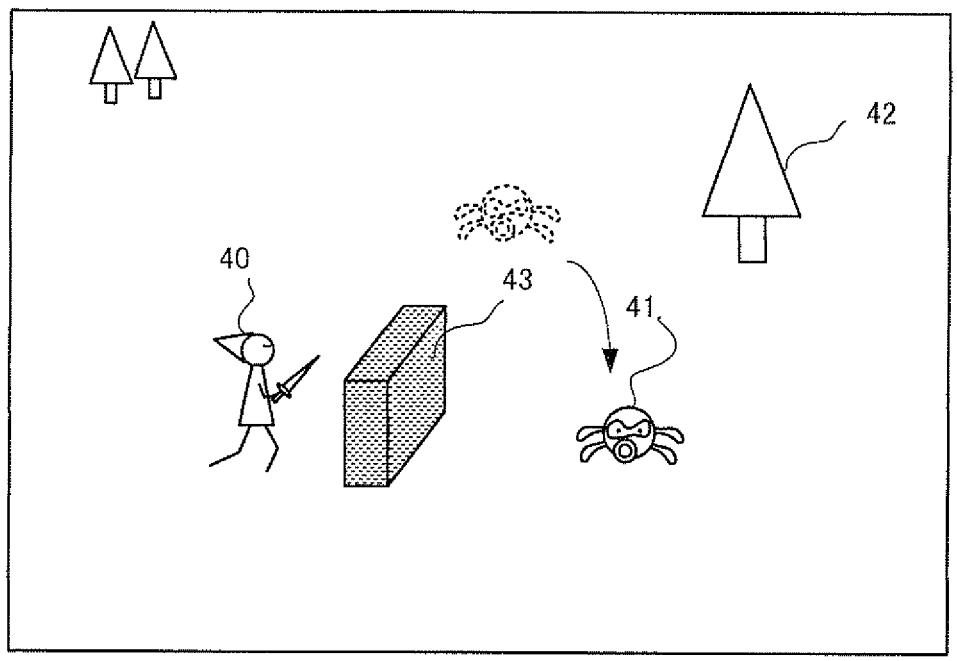

COMPUTER-READABLE STORAGE MEDIUM HAVING OBJECT CONTROL PROGRAM STORED THEREIN AND OBJECT CONTROL APPARATUS

CROSS REFERENCE OF RELATED APPLICATION

The disclosure of Japanese Patent Application No. 2009-250672, filed on Oct. 30, 2009 is incorporated herein by reference.

FIELD

The technology herein relates to a computer-readable storage medium having an object control program stored therein and an object control apparatus and relates to, for example, a computer-readable storage medium having stored therein an object control program for controlling a motion of an object in accordance with a user's input to an input device operable to designate a position on a screen of a display device and an object control apparatus.

BACKGROUND AND SUMMARY

Conventionally, there is a program which causes an operational object, which is operated by a user in accordance with a user's input to an input device operable to designate a position on a screen of a display device, to perform a predetermined motion. For example, in a game described in non-patent document 1 ("The Legend of Zelda: Phantom Hourglass, operating instructions", Nintendo Co., Ltd., Jun. 23, 2007, p. 14-17), in a case where a first operation (operation of drawing a circle) is performed onto an input device, the operational object performs a first motion (forward rolls). On the other hand, in a case where a second operation (touch operation) is performed onto the input device, the operational object performs a second motion (lock-on slash) against a predetermined object (enemy).

However, in the program described in non-patent document 1, for example, when a user intends to cause the operational object to perform the second motion and performs the second operation while the above-mentioned predetermined object is moving, there may be a case where the first motion is performed. Accordingly, in the program described in non-patent document 1, there is room for improvement in terms of causing the operational object to perform a motion as intended by a user.

Therefore, an object in certain example embodiments provide a computer-readable storage medium having stored therein an object control program which allows an object operated by a user to perform a motion intended by a user and an apparatus operable to execute the same.

Certain example embodiments have following features to attain the object mentioned above.

One embodiment is directed to a computer-readable storage medium having stored therein an object control program executed by a computer in an object control apparatus for controlling an operational object in a virtual space, the operational object operated in accordance with a user's input to an input device operable to designate a position on a screen of a display device. The object control program causes the above-mentioned computer to function as: position detection means, area setting means, area holding means, motion control means, and area determination means. The position detection means detects, based on an output signal from the above-mentioned input device, a position on the above-mentioned screen, which is designated by a user. The area setting means sets a predetermined area in a position of a predetermined object in the virtual space, which is different from the above-mentioned operational object. The area holding means holds the predetermined area set by the above-mentioned area setting means until a predetermined hold period has elapsed. The motion control means detects, based on an output signal from the above-mentioned input device, a first operation onto the above-mentioned screen and causes the above-mentioned operational object to perform a first motion in accordance with the first operation. The area determination means determines whether or not the position detected by the above-mentioned position detection means is present in the predetermined area held by the above-mentioned area holding means. The above-mentioned area holding means holds, even in a case where the above-mentioned predetermined object has moved in the above-mentioned virtual space, the above-mentioned predetermined area at a position where the predetermined object has been present before movement. And the above-mentioned motion control means prohibits the above-mentioned operational object from performing the above-mentioned first motion when a determination result made by the above-mentioned area determination means is positive even in a case where the above-mentioned first operation is performed.

The above-mentioned predetermined object may be an object operated by another user different from the above-mentioned user and be an object controlled by the object control apparatus.

As described above, the predetermined area is set in the position of the predetermined object and is held for the predetermined hold period. Even in the case where the predetermined object has moved, the predetermined area is held in the position where the predetermined object has been present before the movement. When the position detected by the position detection means is present in the above-mentioned predetermined area, the above-mentioned operational object is caused not to perform the first motion even in the case where the first operation is performed. This allows the operational object to be prohibited from performing a motion which a user does not intend.

In one embodiment, the above-mentioned area setting means may set the above-mentioned predetermined area based on an output signal from the input device when a user's designation to the predetermined object is detected.

As described above, when the above-mentioned predetermined object is designated by a user, the above-mentioned predetermined area can be set.

In one embodiment, the above-mentioned motion control means may cause the above-mentioned operational object to perform a second motion different from the above-mentioned first motion when the determination result made by the above-mentioned area determination means is positive.

As described above, the above-mentioned operational object can be caused to perform the second motion, instead of the above-mentioned first motion.

In one embodiment, the above-mentioned motion control means may detect the first operation or a second operation different from the first operation onto the above-mentioned screen based on an output signal from the above-mentioned input device. In this case, when the determination result made by the above-mentioned area determination means is positive, the above-mentioned motion control means may cause the above-mentioned operational object to perform the above-mentioned second motion in accordance with the above-mentioned first operation or the above-mentioned second operation.

As described above, when the position designated by a user is present in the above-mentioned predetermined area, the above-mentioned operational object can be caused to perform the second motion in accordance with the above-mentioned first operation or the above-mentioned second operation.

In one embodiment, when the determination result made by the above-mentioned area determination means is negative, the above-mentioned motion control means may cause the above-mentioned operational object to perform the first motion in accordance with the above-mentioned first operation.

As described above, when the position detected by the above-mentioned position detection means is not present in the above-mentioned predetermined area, the above-mentioned operational object can be caused to perform the first motion. This can cause the operational object to perform a motion which a user intends.

In one embodiment, the above-mentioned motion control means may detect the above-mentioned first operation when a predetermined operation onto the above-mentioned input device is repeatedly detected for a predetermined detection period.

As described above, when the predetermined operation onto the above-mentioned input device is repeatedly detected for the predetermined detection period, the above-mentioned first operation can be detected. For example, when a double-touch operation onto the input device such as a touch panel is detected, the above-mentioned first operation can be detected.

In one embodiment, the above-mentioned hold period may be longer than the above-mentioned detection period.

As described above, the above-mentioned hold period can be made longer than the above-mentioned detection period. In other words, a period for which the above-mentioned predetermined area is held can to be made longer than a period for which the above-mentioned predetermined operation is detected. This allows, for example, the period for which the above-mentioned predetermined area is held can be made longer than a detection period for which the double-touch is detected and can cause the above-mentioned operational object to perform a motion which a user intends.

In one embodiment, when the above-mentioned predetermined object has moved in the above-mentioned virtual space, the above-mentioned area holding means may move the above-mentioned predetermined area in accordance with the movement of the predetermined object. In this case, the above-mentioned area determination means determines whether or not a position detected by the above-mentioned position detection means is present in any of either an area into which the predetermined area has been moved by the above-mentioned area holding means or an area where the predetermined area has been held by the above-mentioned area holding means.

As described above, the above-mentioned predetermined area can be moved in conjunction with the movement of the above-mentioned predetermined object and the above-mentioned predetermined area can be also held at the position where the above-mentioned predetermined object has been present before the movement. It can be determined whether or not the position designated by a user is present in any of either the predetermined area into which the predetermined area has been moved or the area in which the predetermined area has been held.

In one embodiment, when a positional relationship between the above-mentioned operational object and the above-mentioned predetermined object satisfies a predetermined condition, the above-mentioned area setting means may set no said predetermined area.

As described above, the above-mentioned predetermined area can be set in accordance with the above-mentioned positional relationship.

In one embodiment, when through the movement of the above-mentioned operational object and/or the above-mentioned predetermined object, a positional relationship between the above-mentioned operational object and the above-mentioned predetermined object comes to satisfy a predetermined condition, the above-mentioned area setting means may cause the above-mentioned predetermined area to disappear.

As described above, when the movement of the object causes the positional relationship between the above-mentioned operational object and the above-mentioned predetermined object to satisfy the predetermined condition, the above-mentioned predetermined area can be caused to disappear.

In one embodiment, when a third object different from the above-mentioned operational object and from the above-mentioned predetermined object comes to be present between the above-mentioned operational object and the above-mentioned predetermined object, the above-mentioned area setting means may cause the above-mentioned predetermined area to disappear.

As described above, when the movement of the above-mentioned operational object or the above-mentioned predetermined object causes the third object to come to be present between the above-mentioned operational object and the above-mentioned predetermined object, the above-mentioned predetermined area can be caused to disappear.

In one embodiment, the above-mentioned area setting means may set the above-mentioned hold period in accordance with a kind of the above-mentioned predetermined object.

As described above, the period for which the above-mentioned predetermined area is held can be set in accordance with the kind of the object. For example, the above-mentioned predetermined period for an object whose movement velocity is fast can be set to be short.

In one embodiment, the above-mentioned computer may be further caused to function as movement control means for automatically moving the above-mentioned predetermined object.

As described above, the above-mentioned predetermined object can be automatically moved.

In one embodiment, the above-mentioned first motion may be a non-attack motion which the above-mentioned operational object is caused to perform, and the above-mentioned second motion may be an attack motion against the above-mentioned predetermined object, which the above-mentioned operational object is caused to perform.

As described above, the above-mentioned operational object can be caused to perform the non-attack motion and the attack motion.

In one embodiment, the above-mentioned area setting means may set a shape of the predetermined area, a size of the predetermined area, or a number of the predetermined areas in accordance with a kind of the predetermined object.

As described above, the shape, number, or size of the above-mentioned predetermined area can be set in accordance with the kind of the above-mentioned predetermined object.

One embodiment is directed to a computer-readable storage medium having stored therein an object control program executed by a computer in an object control apparatus for controlling an operational object in a virtual space, the operational object operated in accordance with a user's input to an input device operable to designate a position on a screen of a display device. The object control program causes the above-mentioned computer to function as: position detection means, area setting means, area holding means, area determination means, and motion control means. The position detection means detects, based on an output signal from the above-mentioned input device, a position on the above-mentioned screen, which is designated by a user. The area setting means sets a predetermined area in a position of a predetermined object in the above-mentioned virtual space, which is different from the above-mentioned operational object. The area holding means holds the predetermined area set by the area setting means until a predetermined hold period has elapsed. The area determination means determines whether or not the position detected by the above-mentioned position detection means is present in the predetermined area held by the above-mentioned area holding means. When a determination result made by the above-mentioned area determination means is positive, the motion control means causes the above-mentioned operational object to perform a first motion in accordance with a predetermined operation onto the above-mentioned input device. In this case, the area holding means holds, even in a case where the above-mentioned predetermined object has moved in the above-mentioned virtual space, the above-mentioned predetermined area at a position where the predetermined object has been present before movement.

As described above, the predetermined area is set for the predetermined object and held for the predetermined hold period. When the above-mentioned predetermined object has moved, the above-mentioned predetermined area is held at the position where the predetermined object has been present before the movement. When the position detected by the position detection means is present in the area being held, the operational object can be caused to perform the first motion. This can cause the operational object to perform a motion which a user intends even in the case where the predetermined object has moved.

One embodiment may be implemented in a form of an object control apparatus for executing the above-mentioned object control program.

According to certain example embodiments, an object operated by a user can be caused to perform a motion which a user intends.

These and other objects, features, aspects and advantages of certain example embodiments will become more apparent from the following detailed description when taken in conjunction with the accompanying drawings.

BRIEF DESCRIPTION OF THE DRAWINGS

FIG. 10 is a diagram illustrating a view in a case where after the player character 40 or the enemy character 41 has moved, a wall object 43 is present between the player character 40 and the enemy character 41;

DESCRIPTION OF THE PREFERRED EMBODIMENTS (Description of Game Apparatus)

Figure 1:
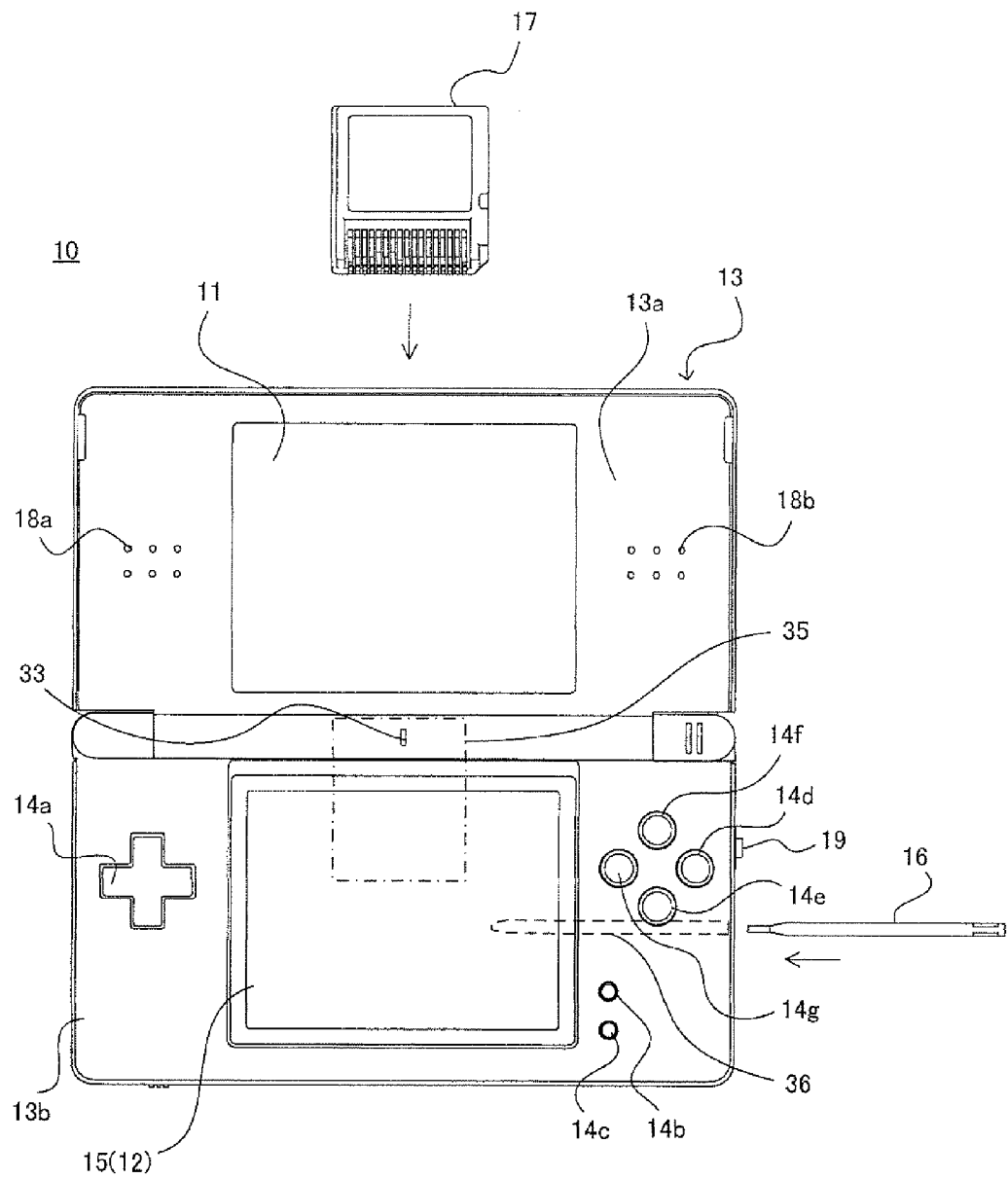
FIG. 1 is an external view of a hand-held game apparatus according to one embodiment.

With reference to drawings, a hand-held game apparatus according to one embodiment, which executes an object control program, will be described. FIG. 1 is an external view of the hand-held game apparatus according to the one embodiment.

In FIG. 1, the game apparatus 10 includes a first LCD (Liquid Crystal Display) 11 and a second LCD 12. A housing 13 comprises an upper housing 13a and a lower housing 13b. The first LCD 11 is accommodated in the upper housing 13a and the second LCD 12 is accommodated in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 3) to an exterior. A description of the pair of loudspeakers will be provided later. A hole 33 for a microphone is provided at a hinge portion which connects the upper and lower housings 13a and 13b in a pivotable manner.

The lower housing 13b is provided with input devices (input parts) as follows; a cross switch 14a, a start switch 14b, a select switch 14c, an "A" button 14d, a "B" button 14e, an "X" button 14f, and a "Y" button 14g. In addition, on a side surface of the lower housing 13b, an "L" button 14L and an "R" button 14R (not shown) are provided. In addition, a touch panel 15 which is a designation detection device is attached on a screen of the second LCD 12 as another input device (input part). On the side surface of the lower housing 13b, a power switch 19, an insertion slot 35 (indicated by a dashed line in FIG. 1) for connecting a memory card 17, and an insertion slot 36 for storing a stick 16 (indicated by a dotted line in FIG. 1) are provided.

The touch panel 15 may be of any type such as a resistive film type, an optical type (infrared type), or a capacitive coupling type. In the present embodiment, the touch panel 15 is of the resistive film type. Touch panel 15 can be operated by not only the stick 16 but also a finger. The touch panel 15 used in the present embodiment has the same resolution at 256 dots×192 dots (detection accuracy) as that of the second LCD 12. However, resolutions of the touch panel 15 and the second LCD 12 is not required to necessarily be the same as each other.

The memory card 17 includes a ROM 17a having a game program stored therein and a EEPROM 17b having backup data rewritably stored therein and is placed in the insertion slot 35 provided in the lower housing 13b in a removable manner. Though not shown in FIG. 1, provided in a depth end of the insertion slot 35 is a connector 23 (see FIG. 2) for connecting with a connector provided at an end portion of the memory card 17. When the memory card 17 is inserted into the insertion slot 35, the connectors are mutually connected, causing a CPU core 21 (see FIG. 2) of the game apparatus 10 to access the memory card 17.

Figure 2:
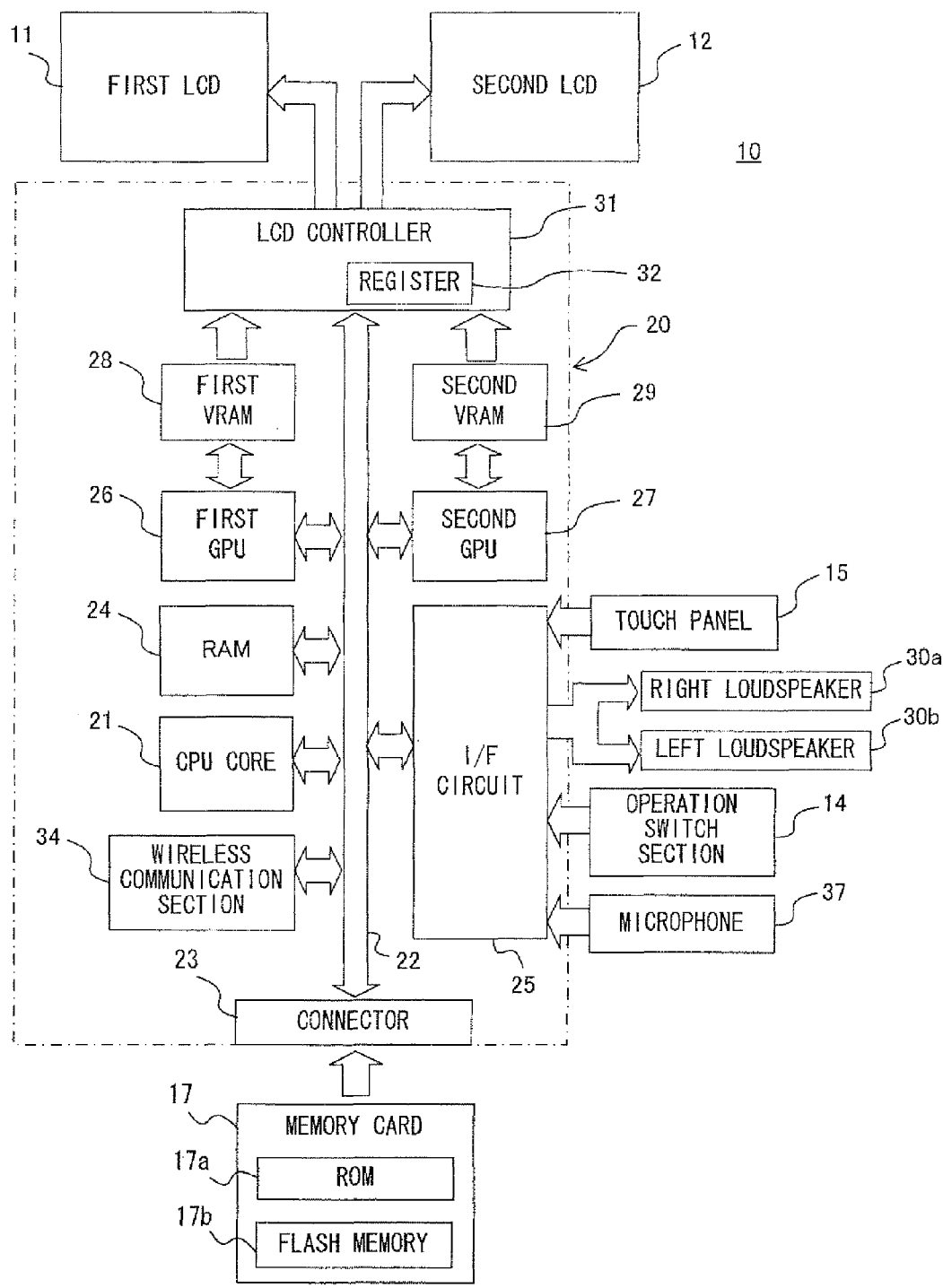
FIG. 2 is a block diagram illustrating an internal configuration of the game apparatus 10.

Next, an internal configuration of the game device 10 will be described with reference to FIG. 2. FIG. 2 is a block diagram illustrating the internal configuration of the game apparatus 10. In FIG. 2, the CPU core 21 is mounted on an electronic circuit board 20 which is to be housed in the housing 13. Via a bus 22, the CPU core 21 is connected to a connector 23, an input/output interface circuit (shown as an I/F circuit in the diagram) 25, a first GPU (Graphics Processing Unit) 26, a second GPU 27, a RAM 24, a LCD controller 31, and a wireless communication section 34. The memory card 17 is connected to the connector 23 in a removable manner. Connected to the I/F circuit 25 are a touch panel 15, a right loudspeaker 30a, a left loudspeaker 30b, an operation switch section 14, which is comprised of the cross switch 14a, the "A" button 14d, and others as shown in FIG. 1, and a microphone 37. The right loudspeaker 30a and the left loudspeaker 30b are arranged inside the sound holes 18a and 18b, respectively. The microphone 37 is arranged inside the hole 33 for the microphone.

A first VRAM (Video RAM) 28 is connected to the first GPU 26, and a second VRAM 29 is connected to the second GPU 27. In accordance with an instruction from the CPU core 21, the first GPU 26 generates a first display image and writes it into the first VRAM 28. The second GPU 27 also follows an instruction from the CPU core 21 to generate a second display image and writes it into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first display image which has been written into the first VRAM 28, and outputs to the second LCD 12 the second display image which has been written into the second VRAM 29. When the value of the register 32 is 1, the first display image which has been written into the first VRAM 28 is outputted to the LCD 12, and the second display image which has been written into the second VRAM 29 is outputted to the first LCD 11.

The wireless communication section 34 has a function of receiving and transmitting data to and from a wireless communication section of other game device. In addition, the game apparatus 10 can be connected to a wide area network such as the Internet via the wireless communication section 34 and also can communicate with other game apparatus via a network.

(Outline of Game)

Figure 3:
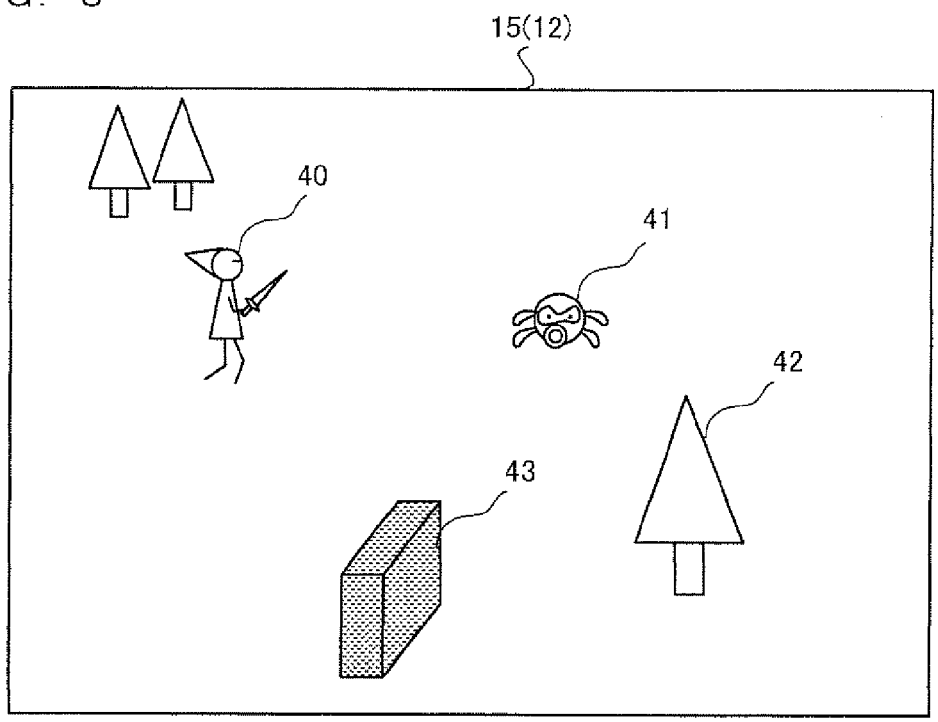
FIG. 3 is a diagram illustrating one example of a game image displayed on a screen of a second LCD 12 while a game in the present embodiment is executed.

Next, with reference to FIG. 3 through FIG. 10, an outline of a game in the present embodiment will be described. In the game in the present embodiment, a player character as an operational object operated by a player moves in a game space and has an adventure while encountering a variety of enemies and other objects. FIG. 3 is a diagram illustrating one example of a game image displayed on a screen of the second LCD 12 while the game in the present embodiment is executed. As shown in FIG. 3, a player character 40, an enemy character 41, a tree object 42, and a wall object 43 are displayed on the screen. A player operates the player character 40 by touching (touch operation) the screen (touch panel 15) of the second LCD 12 with the stick 16. For example, a player touches the screen, thereby moving the player character 40 in the game space or causing the player character 40 to attack the enemy character 41. Hereinafter, motions of the player character 40, performed by the touch operation, will be described.

Figure 4:
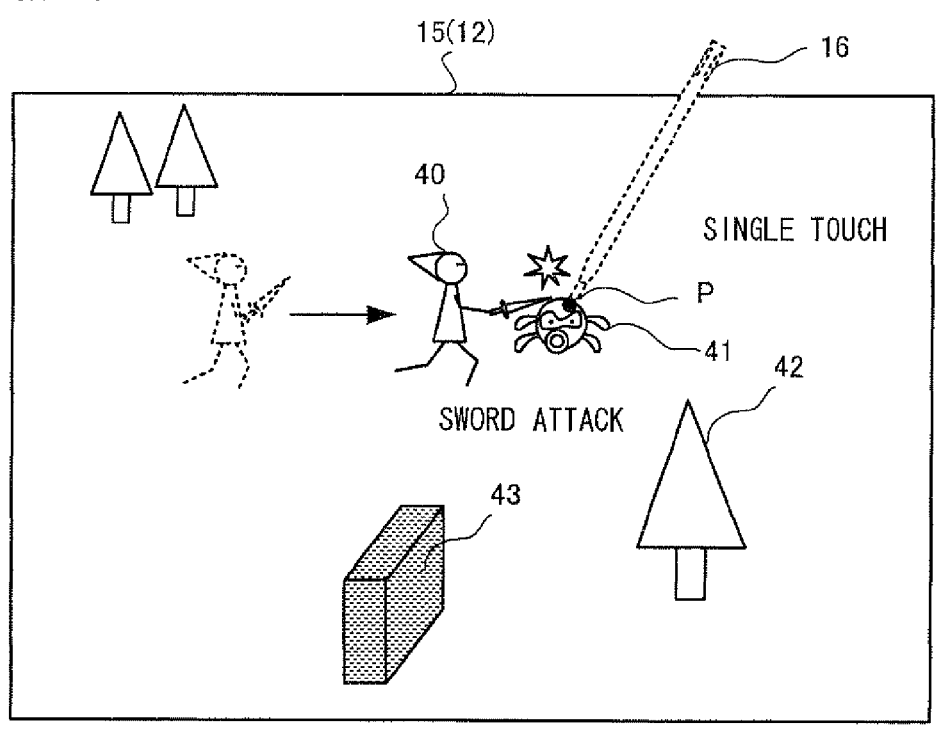
FIG. 4 is a diagram illustrating a view in which a player character 40 attacks an enemy character 41.

FIG. 4 is a diagram illustrating a view in which the player character 40 attacks the enemy character 41. When a player performs with the stick 16 a single-touch (or double-touch) at a position P on the screen on which the enemy character 41 is displayed, the player character 40 walks (or runs) to move to a position where the enemy character 41 is present and attacks the enemy character 41 with a sword. The "single-touch" is a touch operation which a player performs one time onto the touch panel 15 for a predetermined time period. The "double-touch" is a touch operation in which a player quickly touches the touch panel 15, detaches the stick 16 from the touch panel 15, and touches again the same position on the touch panel 15 without sparing time. The double-touch is the touch operation in which a player touches the same position (position having a given range) on the touch panel 15 twice for a predetermined time period (for example, for 0.3 second). In other words, in a case where the second touch is performed at the position within the given range from the first touch position (for example, within a circle having a predetermined radius, whose center is the first touch position) within the above-mentioned predetermined time period, the game apparatus 10 determines that the double-touch is performed. As described above, a player touches the position where the enemy character 41 is displayed, thereby allowing the enemy character 41 to be attacked.

Figure 5:
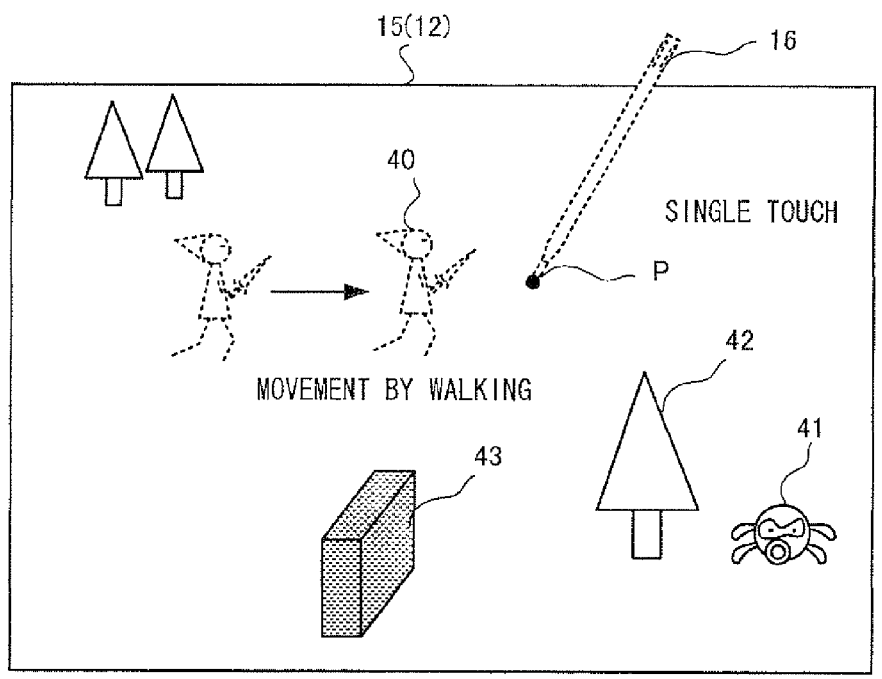
FIG. 5 is a diagram illustrating a view in which the player character 40 walks to move in a game space.

FIG. 5 is a diagram illustrating a view in which the player character 40 walks to move in the game space. As shown in FIG. 5, in a case where a player performs with the stick 16 the single-touch at the position P where the enemy character 41 is not displayed, the player character 40 walks (or runs) to move to a position in the game space, which corresponds to the touch position P.

Figure 6:
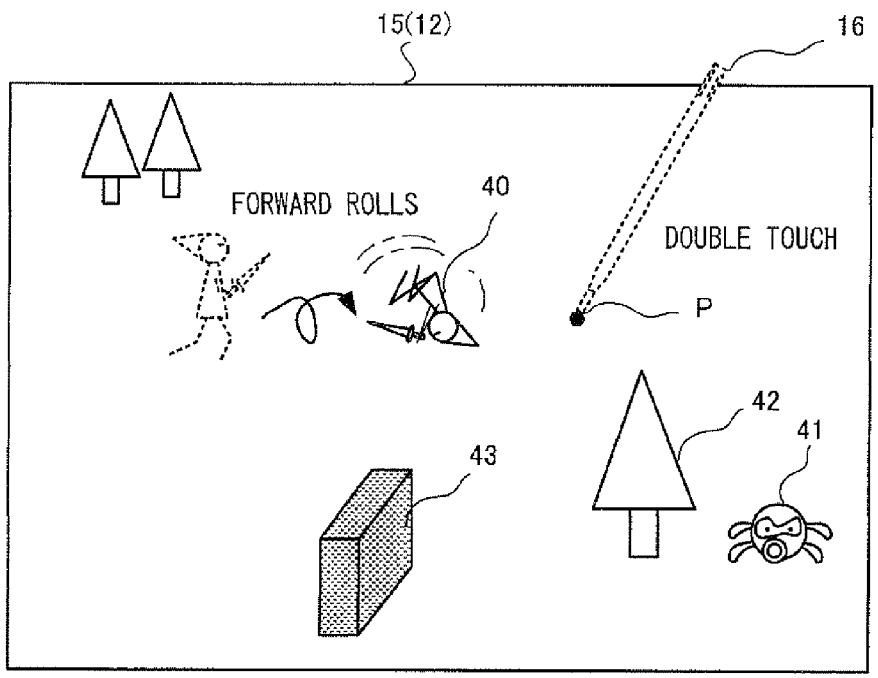
FIG. 6 is a diagram illustrating a view in which the player character 40 moves while performing forward rolls in the game space.

FIG. 6 is a diagram illustrating a view in which the player character 40 moves while performing forward rolls in the game space. As shown in FIG. 6, in a case where a player performs with the stick 16 the double-touch at the position P where the enemy character 41 is not displayed, the player character 40 moves to a position in the game space, which corresponds to the touch position P, while performing the forward rolls. The movement, shown in FIG. 6, made while performing the forward rolls is performed at a movement velocity faster than that at which the player character 40 moves while walking as shown in FIG. 5. In other words, when a player performs the double-touch at the position on the screen, where the enemy character 41 is not displayed, the player character 40 moves in the game space faster than in a case where the single-touch is performed.

As described above, in the game in the present embodiment, in a case where the enemy character 41 is present at the position where a player touches, the enemy character 41 is attacked with not only the single-touch but also the double-touch. In addition, in a case where the enemy character 41 is not present at the position where a player touches, when the single-touch is performed, the player character 40 walks to move to the position in the game space, which corresponds to the touch position, and when the double-touch is performed, the player character 40 moves to the position in the game space, which corresponds to the touch position, while performing the forward rolls.

Next, ways of determination of the respective motions (the sword attack, the movement by walking, and the forward rolls), which the above-mentioned player character 40 performs, will be described. In the present embodiment, since each of the above-mentioned respective motions is determined based on the touch operation performed by a player, a prohibition area for a position of the enemy character 41 is provided. Here, the "prohibition area" is an area where the player character 40 is prohibited from moving while performing the forward rolls and where the player character 40 is caused not to perform the forward rolls even in a case where a player touches the prohibition area.

Figure 7A:
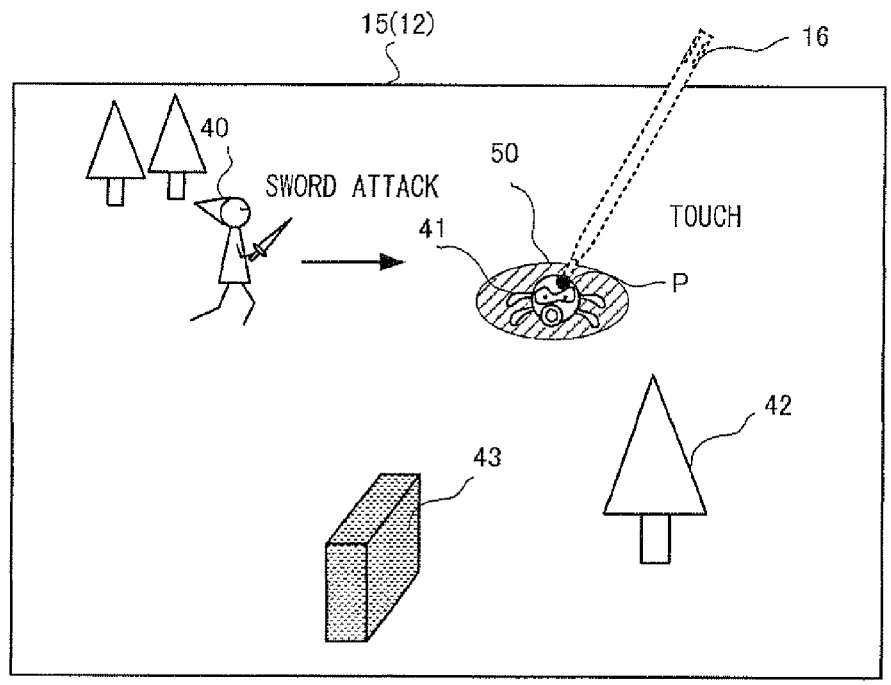
FIG. 7A is a diagram illustrating a view in which a prohibition area is generated.

FIG. 7A is a diagram illustrating a view in which the prohibition area is generated. As shown in FIG. 7A, in a case where a player performs the single-touch at the position P where the enemy character 41 is displayed, the prohibition area 50 whose center is the position of the enemy character 41 in the game space and which is of a circular or elliptical shape is generated. The prohibition area 50 is an area virtually provided in the game space and is not actually displayed on the screen. In addition, in conjunction with the generation of the prohibition area 50, the player character 40 attacks the enemy character 41. In other words, when the game apparatus 10 detects the single-touch onto the enemy character 41, the game apparatus 10 causes the prohibition area 50 to be generated and the player character 40 to attack the enemy character 41.

The prohibition area 50 continues to be present for a predetermined time period from when the prohibition area 50 is generated. After a lapse of the predetermined time period, the prohibition area 50 disappears. A time period from when the prohibition area 50 is generated to when the prohibition area 50 disappears may be set to be, for example, two seconds. When a player touches the enemy character 41 again after the prohibition area 50 disappears, the prohibition area 50 is also generated again.

Figure 7B:
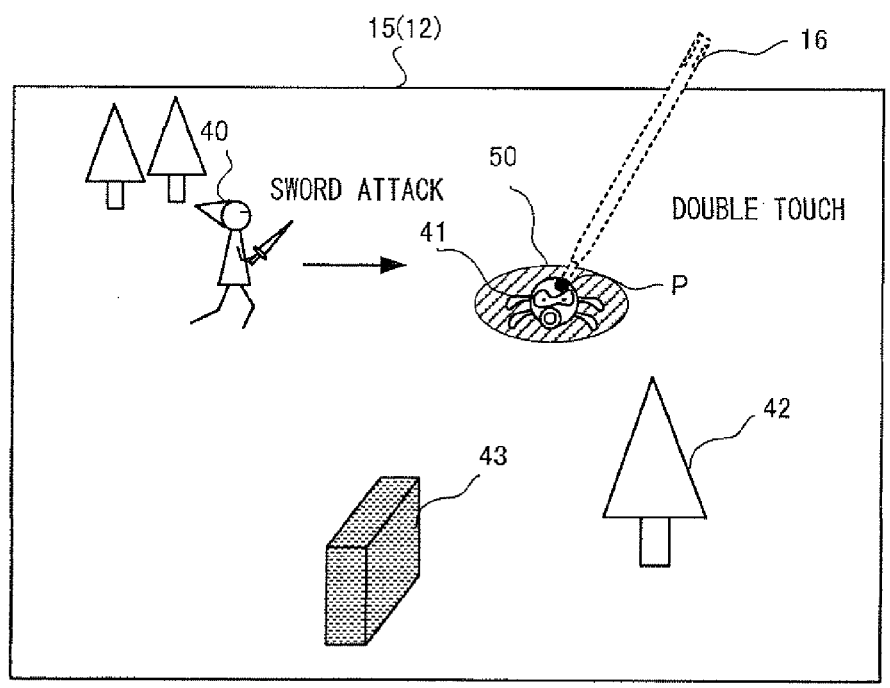
FIG. 7B is a diagram illustrating a motion performed by the player character 40 in a case where a double-touch is performed in a prohibition area 50.

On the other hand, in a case where a player performs the double-touch at the position P where the enemy character 41 is displayed, as similarly to in the case where the single-touch is performed, the first touch operation causes the prohibition area 50 to be generated. In the case where the double-touch is performed, since a position touched for a second time is present within the prohibition area 50, the player character 40 attacks the enemy character 41 without performing the above-mentioned forward roll motion. FIG. 7B is a diagram illustrating the motion performed by the player character 40 in the case where the double-touch is performed in the prohibition area 50. As shown in FIG. 7B, even when the game apparatus 10 detects the double-touch in the prohibition area 50, the game apparatus 10 does not cause the player character 40 to perform the forward rolls but causes the player character 40 to attack the enemy character 41. In other words, since the prohibition area 50 is the area where the forward roll motion is prohibited, the attack is performed instead of the forward rolls.

Figure 8:
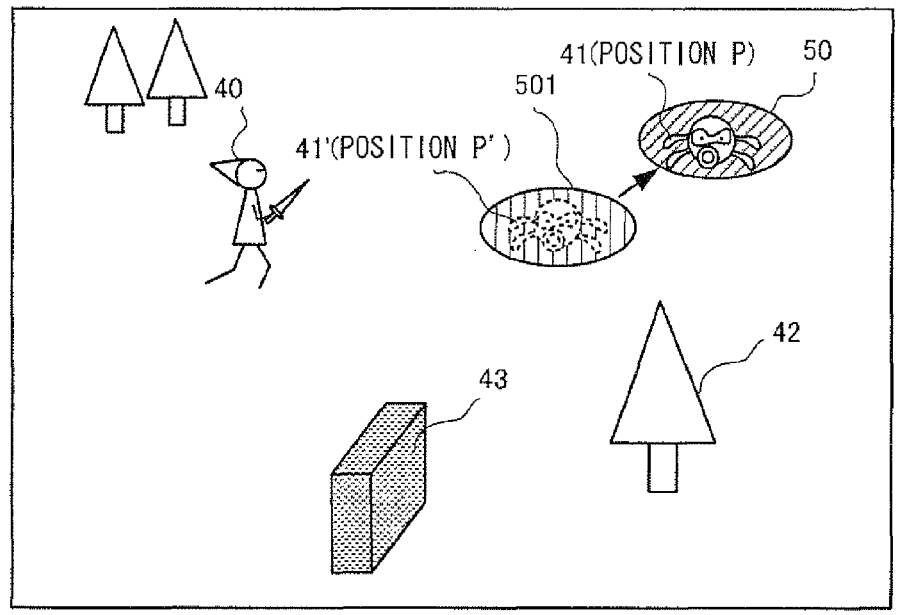
FIG. 8 is a diagram illustrating a view in which the prohibition area 50 moves in a case where the enemy character 41 moves.

Next, a case where the enemy character 41 moves will be described. The prohibition area 50 generated by the first touch operation (the single-touch operation and the first touch in the double-touch operation) moves in conjunction with movement of the enemy character 41. FIG. 8 is a diagram illustrating a view in which the prohibition area 50 moves in a case where the enemy character 41 moves. In FIG. 8, 41' indicates the enemy character 41 which appears before the movement and 41 indicates the enemy character 41 which appears after the movement. Note that the enemy character 41' is not actually displayed on the screen. As shown in FIG. 8, in a case where the enemy character 41 moves from a position P' to a position P, the prohibition area 50 also moves in accordance with an amount of the movement of the enemy character 41. In other words, since the prohibition area 50 is an area which is set so as to correspond to a position of the enemy character 41, the prohibition area 50 moves in conjunction with the movement of the enemy character 41.

Further, the prohibition area 50 which has been set so as to correspond to the position P' of the enemy character 41' appearing before the movement is stored as a storage prohibition area 501 in the game apparatus 10. In other words, although the prohibition area 50 moves in conjunction with the movement of the enemy character 41, the storage prohibition area 501 is set for the position before the movement. The storage prohibition area 501 does not move in conjunction with the movement of the enemy character 41. As similarly to the prohibition area 50, the storage prohibition area 501 is an area where the player character 40 is prohibited from performing the forward roll motion. The storage prohibition area 501 is present in a predetermined time period and thereafter, disappears. Note that a time period (time period for which the storage prohibition area 501 is present) from when the storage prohibition area 501 is generated to when the storage prohibition area 501 disappears is shorter than the time period (time period for which the prohibition area 50 is present) from when the prohibition area 50 is generated to when the prohibition area 50 disappears. For example, the time period from when the storage prohibition area 501 is generated to when the storage prohibition area 501 disappears is set to be longer than the time period (for example, 0.3 second) for which the double-touch is detected and may be set to be, for example, 0.5 second.

In a case where the enemy character 41 shown in FIG. 8, appearing after the movement, thereafter further moves, the prohibition area 50 moves in conjunction with the further movement and concurrently, a storage prohibition area 502 is newly provided for the position of the prohibition area 50 appearing before the further movement. In such a manner, a storage prohibition area 50i (i is a positive integer) is set in accordance with the movement of the enemy character 41 and each storage prohibition area disappears after a lapse of the time period for which each storage prohibition area is present.

Figure 9:
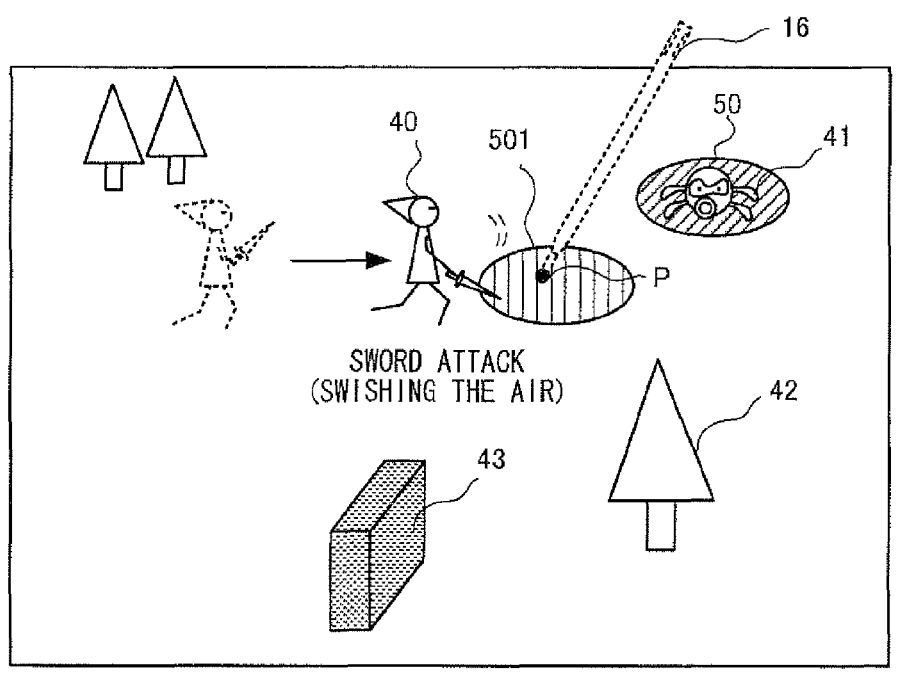
FIG. 9 is a diagram illustrating a motion of the player character 40 in a case where a player performs the double-touch at a position where the enemy character 41 has been present before movement.

FIG. 9 is a diagram illustrating a motion of the player character 40 in a case where a player performs the double-touch at a position where the enemy character 41 has been present before the movement. As shown FIG. 9, in a case where a player performs the double-touch in the storage prohibition area 501, the player character 40 performs an attack motion. However, since the enemy character 41 has moved and is not present at the touch position, the enemy character 41 is not attacked and a sword attack results in swishing the air. Note that also in a case where a player performs the single-touch in the storage prohibition area 501, a sword attack similarly results in swishing the air.

As described above, since the storage prohibition area 501 is provided, the player character 40 can be caused to be prohibited from performing the forward roll motion even after the enemy character 41 has moved. In a case where a player touches the enemy character 41 and causes the player character 40 to perform the attack motion, there may be a case where the enemy character 41 is repeatedly touched by a player in order to repeatedly impart damage to the enemy character 41. In this case, when the enemy character 41 moves, there may be a case where a touch motion performed by a player cannot catch up with the movement of the enemy character 41. Then, the enemy character 41 comes not to be present at a position in the game space, which corresponds to a position repeatedly touched by a player, the game apparatus 10 detects the double-touch at the position where the enemy character 41 is not present. In this case, if the above-mentioned storage prohibition area 501 is not provided, the game apparatus 10 causes the player character 40 to perform the forward rolls at the above-mentioned position and an operation which is different from an operation intended by a player is performed. Accordingly, as described above, the prohibition area 50 and the storage prohibition area 501 are set, whereby the operation intended by a player can be accurately distinguished and reflected in game processing.

A shape of the above-mentioned prohibition area 50 is not limited to the circular or elliptical shape but may be, for example, a polygonal or three-dimensional shape. In addition, a plurality of the above-mentioned prohibition areas 50 may be provided so as to correspond to positions where the enemy character 41 is present. For example, in a case where the enemy character 41 has two legs, the plurality of the above-mentioned prohibition areas 50 may be provided so as to be located around centers of ankles of the two legs.

In addition, as shown in FIG. 10, in a case where after the player character 40 or the enemy character 41 has moved, the wall object 43 is present between the player character 40 and the enemy character 41, before the lapse of the time period from when the prohibition area 50 is generated to when the prohibition area 50 disappears, the prohibition area 50 may be caused to disappear. FIG. 10 is a diagram illustrating a view in the case where after the player character 40 or the enemy character 41 has moved, the wall object 43 is present between the player character 40 and the enemy character 41. In this case, when a player performs the double-touch on the enemy character 41, since the prohibition area 50 is not set for the enemy character 41, the player character 40 performs the forward roll motion. However, since the wall object 43 is present between the player character 40 and the enemy character 41, the player character 40 collides with the wall object 43 in midstream of the forward roll motion and stops. Therefore, the player character 40 cannot move to a position of the enemy character 41 while performing the forward rolls.

(Details of Game Processing)

Figure 11:
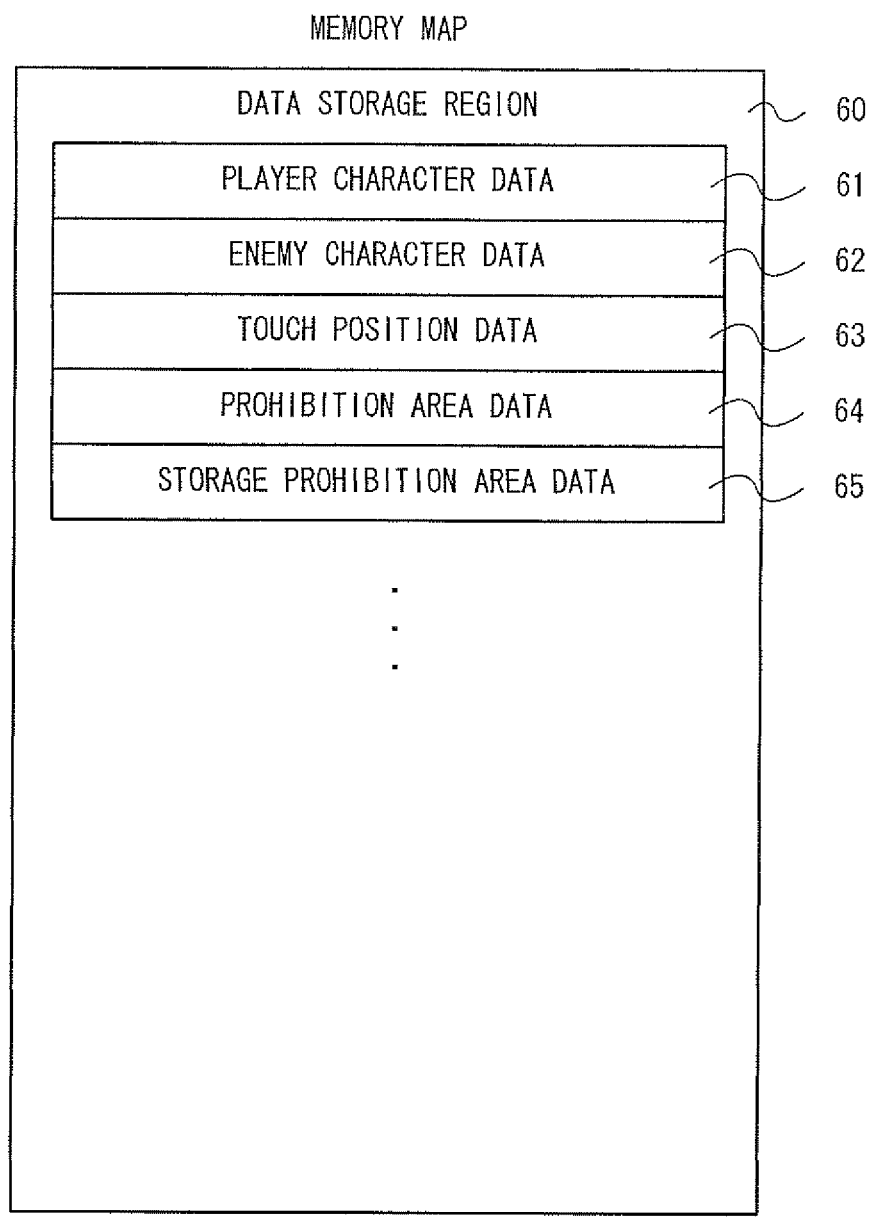
FIG. 11 is a diagram showing a memory map of a RAM 24 in the game apparatus 10.

Next, game processing in the present embodiment will be described in detail. First, main data stored in the RAM 24 during the game processing will be described. FIG. 11 is a diagram showing a memory map of the RAM 24 in the game apparatus 10. As shown in FIG. 11, a data storage region 60 is provided in the RAM 24. In the data storage region 60, player character data 61, enemy character data 62, touch position data 63, prohibition area data 64, storage prohibition area data 65, and the like are stored. Besides these pieces of data, a game program for executing the above-mentioned game processing, image data of the player character 40, image data of the enemy character 41, image data of other objects, and the like are stored in the RAM 24.

The player character data 61 shows a position of the player character 40 in the game space.

The enemy character data 62 shows a position of the enemy character 41 in the game space and a designation determination area of the enemy character 41. The "designation determination area" is to determine whether or not the enemy character 41 is designated in a case where a player performs designation on the screen. The designation determination area for the enemy character 41 includes an area where the enemy character 41 is displayed on the screen and may be of, for example a columnar shape. Note that the above-mentioned designation determination area may be of any shape and may be smaller than the area where the enemy character 41 is displayed.

The touch position data 63 is an aggregate of pieces of data showing positions touched by a player. The touch position data 63 shows coordinate values corresponding to positions on the screen of the second LCD 12. In the touch position data 63, at least the latest touch position and a position touched immediately before the latest touch position is touched are stored.

The prohibition area data 64 shows a position, a shape, and a timer of the prohibition area 50. The timer of the prohibition area 50 is a value showing a remaining time period for which the prohibition area 50 is present and is represented by the number of frames. The storage prohibition area data 65 shows a position, a shape, and a timer of the respective prohibition area 50$i$ ($i$ is a positive integer).

Figure 12:
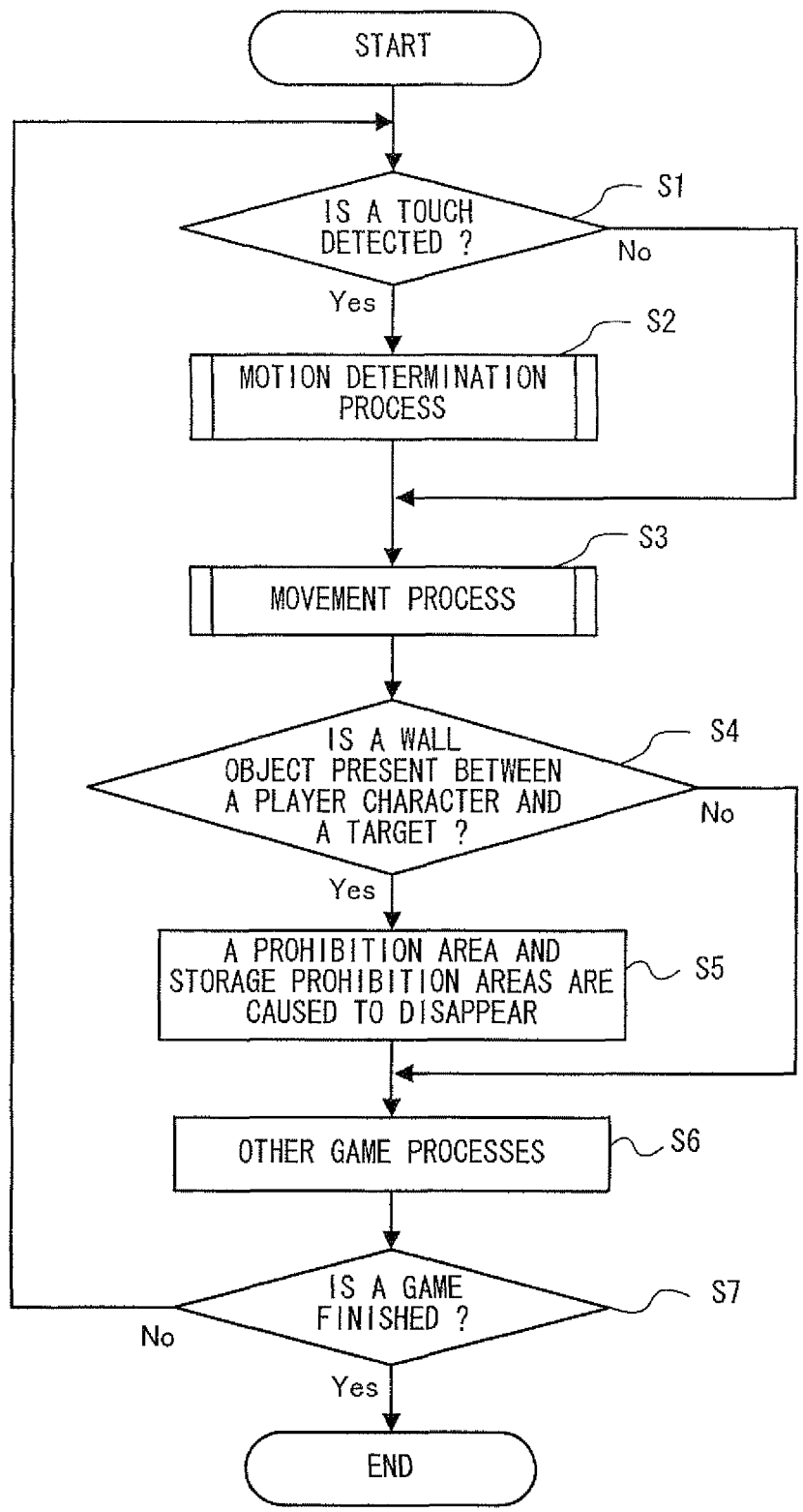
FIG. 12 is a main flow chart showing details of game processing in the present embodiment.

Next, with reference to FIG. 12, details of the game processing will be described. FIG. 12 is a main flow chart showing the details of the game processing in the present embodiment. Upon powering on the game apparatus 10, the CPU core 21 in the game apparatus 10 executes a boot program stored in the ROM (not shown), thereby initializing the respective units such as the RAM 24. Next, the game program stored in the ROM 17$a$ is loaded to the RAM 24 and the CPU core 21 starts executing the game program. The flow chart shown in FIG. 12 shows the game processing performed after the above-mentioned processes have been completed. Note that some descriptions of game processes which do not directly relate to certain example embodiments will be omitted. In addition, a processing loop of step S1 through step S7 shown in FIG. 12 is repeatedly executed per one frame (for example, ⅓₀ second, which is referred to as a frame time).

First, at step S1, the CPU core 21 detects a touch onto the touch panel 15. When a determination result is positive, the CPU core 21 stores the detected touch position as the touch position data 63 in the RAM 24. When the determination result is positive, the CPU core 21 next executes a process at step S2. On the other hand, when the determination result is negative, the CPU core 21 next executes a process at step S3.

Figure 13:
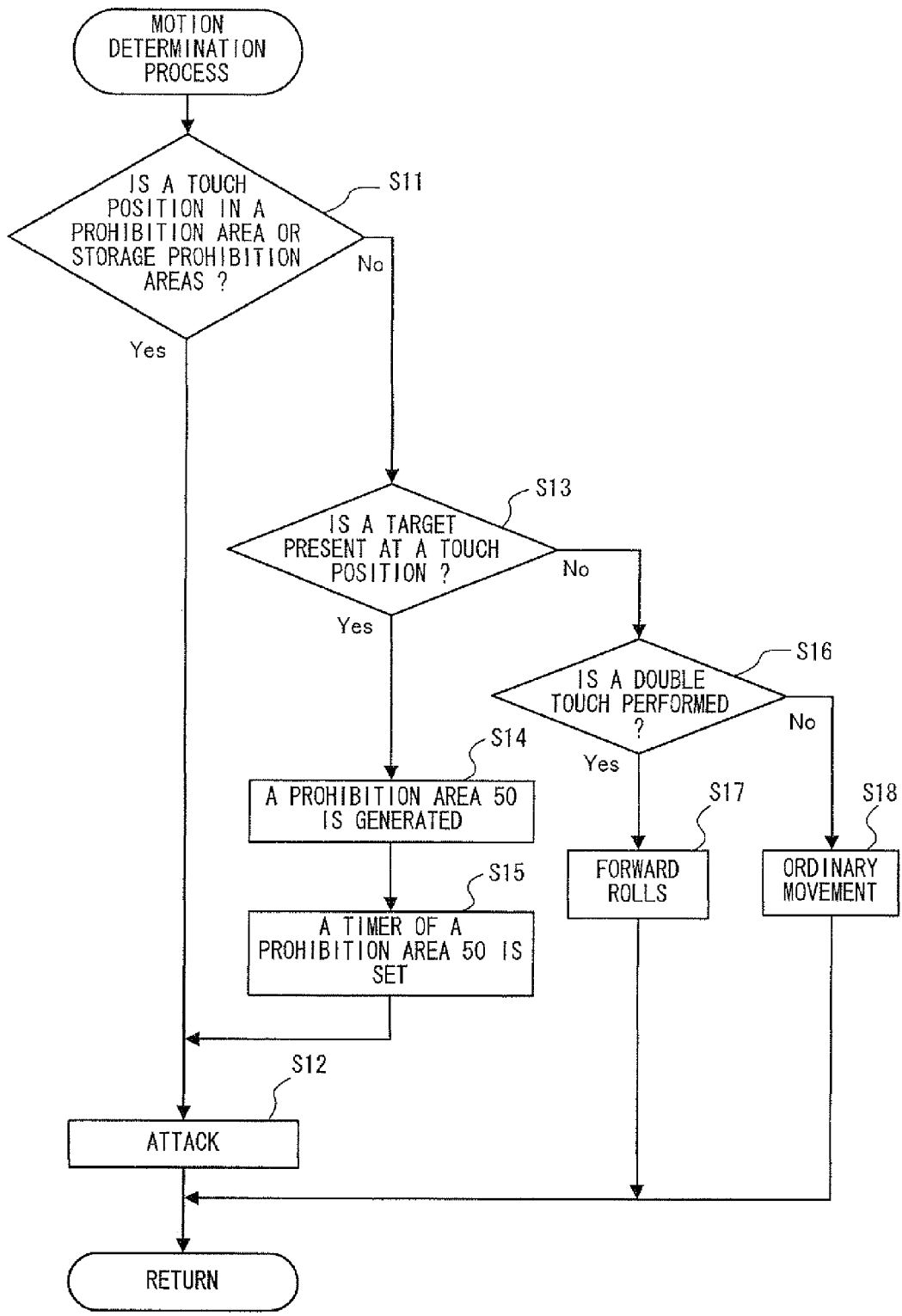
FIG. 13 is a flow chart showing details of a motion determination process (step S2)

At step S2, the CPU core 21 performs a motion determination process. Here, based on the detected touch position, a motion of the player character 40 is determined. With reference to FIG. 13, details of the motion determination process at step S2 will be described. FIG. 13 is a flow chart showing the details of the motion determination process (step S2).

At step S11, the CPU core 21 determines whether or not the detected touch position is present in the prohibition area or the storage prohibition areas. Specifically, referring to the touch position data 63 in the RAM 24, the CPU core 21 obtains the latest touch position detected at step S1. Referring to the prohibition area data 64 in the RAM 24, the CPU core 21 determines whether or not the obtained latest touch position is present in the prohibition area 50. In addition, referring to the storage prohibition area data 65 in the RAM 24, the CPU core 21 determines whether or not the obtained latest touch position is present inside the storage prohibition area 50i. When a determination result is positive (that is, when the latest touch position is present in the prohibition area 50 or the prohibition area 50i), the CPU core 21 next executes a process at step S12. On the other hand, when the determination result is negative, the CPU core 21 next executes a process at step S13.

At step S12, the CPU core 21 determines that the motion of the player character 40 is an attack motion and finishes the motion determination process.

At step S13, the CPU core 21 determines whether or not a target is present at the touch position. Here, the "target" is a target for which the prohibition area 50 is set and specifically, is the above-mentioned enemy character 41. Note that the "target" may be an object other than the above-mentioned enemy character 41. At step S13, specifically, referring to the enemy character data 62, the CPU core 21 determines whether or not the latest touch position is present in the designation determination area for the enemy character 41. When a determination result is positive, the CPU core 21 next executes a process at step S14. When the determination result is negative, the CPU core 21 next executes a process at step S16.

At step S14, the CPU core 21 causes the prohibition area 50 to be generated. Specifically, referring to the enemy character data 62, the CPU core 21 sets the prohibition area 50 having a predetermined shape at the position of the enemy character 41 and stores this prohibition area 50 as the prohibition area data 64 in the RAM 24. Next, the CPU core 21 executes a process at step S15.

At step S15, the CPU core 21 sets the timer of the prohibition area 50 to be a predetermined value and stores this timer in the RAM 24 (the timer in the prohibition area data 64 is set). For example, the CPU core 21 sets the timer of the prohibition area 50 to be 60 (which is two seconds when converted in terms of a time period). After the process at step S15, the CPU core 21 executes the process at step S12.

On the other hand, at step S16, the CPU core 21 determines whether or not the double-touch is performed. Specifically, referring to the touch position data 63, the CPU core 21 determines whether or not the latest touch position and the position touched immediately before the latest touch position is touched are in a predetermined range and these touch positions are detected within a predetermined time period. For example, the CPU core 21 determines whether or not a distance between the touch position touched immediately before the latest touch position is touched and the latest touch position is less than a threshold and a lapse of a time period from when the touch position touched immediately before the latest touch position is touched is less than or equal to a nine-frame time (0.3 second). When a determination result is positive, the CPU core 21 determines that the currently performed touch operation is the second touch in the double-touch operation and next executes a process at step S17. On the other hand, when the determination result is negative, the CPU core 21 next executes a process at step S18.

At step S17, the CPU core 21 determines that the motion of the player character 40 is the forward roll motion and finishes the motion determination process.

At step S18, the CPU core 21 determines that the motion of the player character 40 is a motion of ordinary movement (that is, a walking motion) and finishes the motion determination process. Note that there may be a case where the player character 40 is not caused to walk to move at the later-described step S6 even when it is determined at step S18 that the motion of the player character 40 is the motion of the ordinary movement. In other words, in the determination at step S16 regarding whether or not the double-touch is performed, the detected touch operation is likely to be the first touch operation in the double-touch operation. Accordingly, even when it is determined at step S16 that the single-touch is performed, in a case where the double-touch is thereafter detected, the motion (walking motion) in accordance with the first touch operation is not executed.

With reference back to FIG. 12, after the process at step S2, the CPU core 21 next executes the process at step S3.

Figure 14:
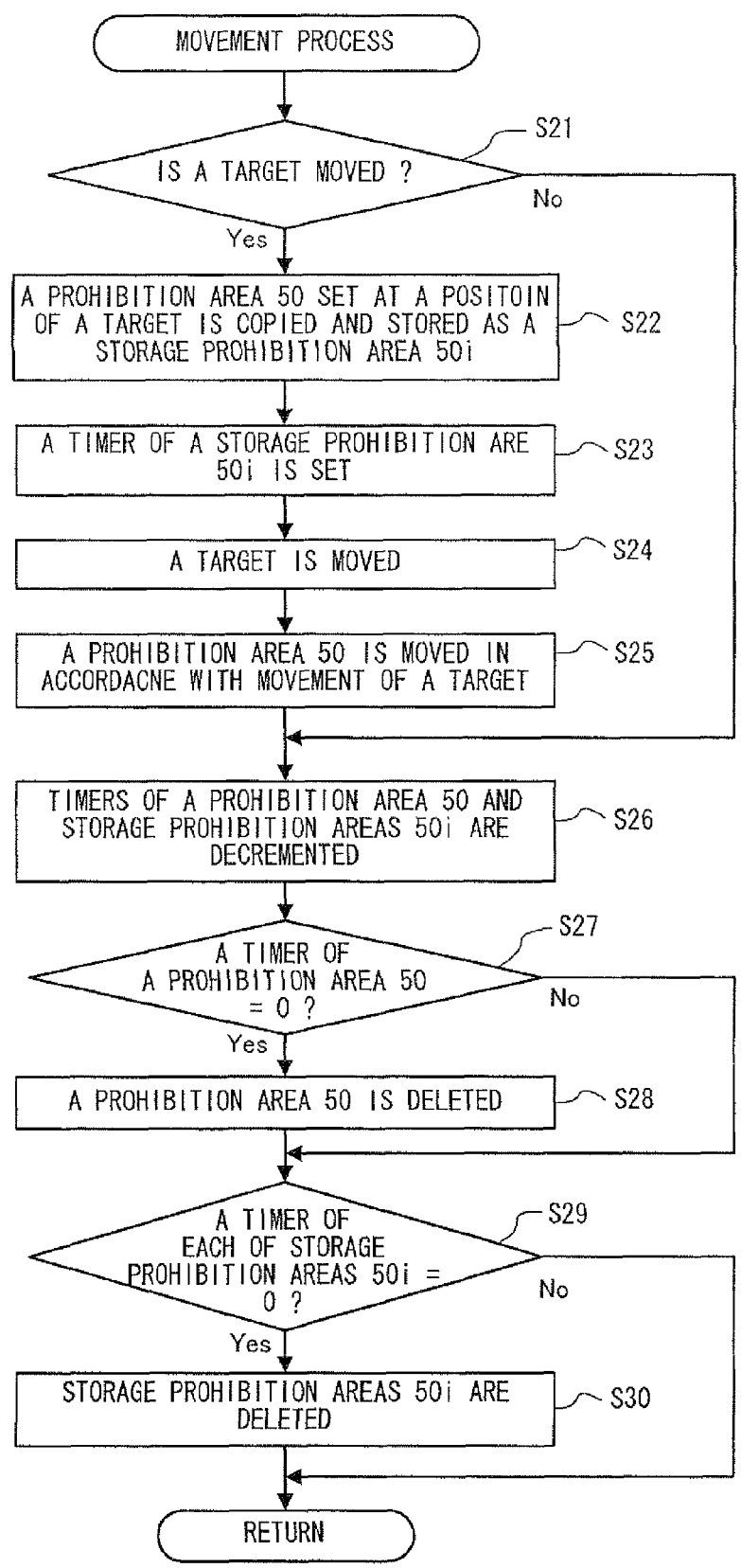
FIG. 14 is a flow chart showing details of a movement process (step S3)

At step S3, the CPU core 21 executes the movement process. In the process at step S3, the enemy character 41 is moved in the game space, and the prohibition area 50 and the storage prohibition area 50i are generated. With reference to FIG. 14, details of the movement process at step S3 will be described. FIG. 14 is a flow chart showing the details of the movement process (step S3).

At step S21, the CPU core 21 determines whether or not the target (enemy character 41) is moved. The enemy character 41 is moved in the game space with a predetermined algorithm (the enemy character 41 is moved in the game space in a predetermined pattern or in a random manner). The CPU core 21 determines in accordance with time and other game states whether or not the enemy character 41 is moved. Further, when the CPU core 21 determines that the target is moved, a movement vector indicating a movement direction and a movement distance is determined. When a determination result is positive, the CPU core 21 next executes a process at step S22. On the other hand, when the determination result is negative, the CPU core 21 next executes a process at step S26.

At step S22, the CPU core 21 copies the prohibition area 50 having been set for the target (enemy character 41) and stores the copied prohibition area 50 as the storage prohibition area 50i in the RAM 24. Specifically, referring to the prohibition area data 64, the CPU core 21 obtains a position and a shape of the prohibition area 50 and stores these as the storage prohibition area data 65 in the RAM 24. The CPU core 21 next executes a process at step S23.

At step S23, the CPU core 21 sets the timer of the storage prohibition area 50i to be a predetermined value and stores the set timer in the RAM 24 (the timer of the storage prohibition area data 65 is set). For example, the CPU core 21 sets the timer of the storage prohibition area 50i to be 15 (0.5 second when converted in terms of a time period). The CPU core 21 next executes a process at step S24.

At step S24, the CPU core 21 moves the target. Specifically, referring to the enemy character data 62, the CPU core 21 updates the position of the enemy character 41 (the movement vector determined at step S21 is added to a position vector indicating a current position of the enemy character 41) and stores the updated position in the RAM 24. The CPU core 21 next executes a process at step S25.

At step S25, the CPU core 21 moves the prohibition area 50 in accordance with the movement of the target. Specifically, referring to the prohibition area data 64, the CPU core 21 updates the position of the prohibition area 50 (the movement vector determined at step S21 is added to the position vector of the current position of the prohibition area 50) and stored the updated position in the RAM 24. The CPU core 21 next executes a process at step S26.

At step S26, the CPU core 21 decrements the timers of the prohibition area 50 and the storage prohibition areas 50i. Specifically, referring to the RAM 24, the CPU core 21 decrements the timer of the prohibition area 50 by one and each of the timers of the storage prohibition area 50i by one, respectively. The CPU core 21 next executes a process at step S27.

At step S27, the CPU core 21 determines whether or not the timer of the prohibition area 50 is 0. Here, it is determined whether or not a time period elapsed from when the prohibition area 50 is generated reaches a time period for which the prohibition area 50 is present. When a determination result is positive, the CPU core 21 next executes a process at step S28. On the other hand, when the determination result is negative, the CPU core 21 next executes a process at step S29.

At step S28, by deleting the prohibition area data 64 from the RAM 24, the CPU core 21 causes the prohibition area 50 to disappear. The CPU core 21 next executes a process at step S29.

At step S29, the CPU core 21 determines whether or not the timer of each of the storage prohibition areas 50i is 0. Here, it is determined whether or not a time period elapsed from which each of the storage prohibition areas 50i is generated reaches a time period for which each of the prohibition areas 50i is present. When a determination result is positive, the CPU core 21 next executes a process at step S30. On the other hand, when the determination result is negative, the CPU core 21 finishes the movement process.

At step S30, referring to the storage prohibition area data 65, the CPU core 21 causes the storage prohibition areas 50i to disappear. Here, in the process at step S30, each of the storage prohibition areas 50i, whose timer is 0, is caused to disappear. At step S29 and step S30, the timer of each of the storage prohibition areas 50i is determined and only the storage prohibition area 50i or the storage prohibition areas 50i, whose timer(s) is(are) 0 is(are) caused to disappear. After the process at step S30, the CPU core 21 finishes the movement process.

With reference back to FIG. 12, after the process at step S3, the CPU core 21 next executes the process at step S4.

At step S4, the CPU core 21 determines whether or not the wall object 43 is present between the player character 40 and the target (enemy character 41). Specifically, referring to the RAM 24, the CPU core 21 determines whether or not the wall object 43 is present on a straight line spanning between the position of the player character 40 and the position of the enemy character 41. When a determination result is positive, the CPU core 21 next executes the process at step S5. On the other hand, when the determination result is negative, the CPU core 21 next executes the process at step S6.

St step S5, the CPU core 21 causes the prohibition area 50 and the storage prohibition areas 50i to disappear. Here, the CPU core 21 executes the same processes as those at the above-described step S28 and step S30. The CPU core 21 next executes the process at step S6.

At step S6, the CPU core 21 executes the other game processes. Specifically, at step S6, the CPU core 21 changes parameters of the player character 40 and the enemy character 41 in accordance with the results of the above-mentioned motion determination process and the movement process and executes a rendering process. For example, when it is determined in the above-mentioned motion determination process that the motion of the player character 40 is the attack motion (step S12), after the player character 40 has walked and moved to a position in the game space, which correspond to a touch position, the CPU core 21 displays on the screen a view in which the attack motion is performed at the touch position. In this case, when the enemy character 41 is present at the touch position, the CPU core 21 displays on the screen a view, in which the player character 40 attacks the enemy character 41, or decreases a life parameter of the enemy character 41.

On the other hand, when the enemy character 41 is not present at the touch position, the CPU core 21 displays on the screen a view in which the player character 40 performs swishing the air. In addition, for example, when it is determined in the above-mentioned motion determination process that the motion of the player character 40 is the forward roll motion (step S17), the CPU core 21 displays on the screen a view in which the player character 40 performs the forward rolls from a current position of the player character 40 toward a position in the game space, which corresponds to the touch position and updates the position of the player character 40 in the game space. The CPU core 21 next executes the process at step S7.

At step S7, the CPU core 21 determines whether or not the game is finished. When a determination result is positive, the CPU core 21 finishes the game processing and when the determination result is negative, the CPU core 21 returns to step S1 and repeats the game processing. For example, when a button (for example, the select switch 14c) of the input device, which is to instruct the finishing of the game processing, is pressed by a player, the CPU core 21 finishes the game processing. As described above, the game processing in the present embodiment is finished.

Note that the conditions and the numerical values used in the above-described processes, the order of the processes, and the like are merely illustrative. In other words, the above-mentioned conditions and numerical values may be appropriately adjusted and the above-mentioned order may be any order.

As described above, by setting the prohibition area and holding the prohibition area for the predetermined time period, when a player intends to perform the attack and repeats the touch, the player character 40 can be caused to perform the attack motion. In other words, the player character can be caused to perform the motion as intended by a player.

In the above-described embodiment, when the prohibition area is set, the forward roll motion is prohibited and the attack motion is performed, and when the prohibition area is not set, the forward roll motion is performed. However, the motion performed by the player character 40 may be any motion. For example, in a case where the single-touch at a position where the prohibition area is not set is detected, the player character 40 may be caused to jump to such a touch position. In this case, when the prohibition area is set at such a position, the player character 40 may be caused not to jump and move (jumping and moving may be prohibited).

Specifically, when the player character 40 is caused to perform the first motion (for example, the forward roll movement motion) in accordance with the predetermined operation (touch operation) performed by a player and the prohibition area (or the storage prohibition area) is set at the touch position, the player character 40 may be caused not to perform the above-mentioned first motion (may be prohibited from performing the above-mentioned first motion). In other words, in the above-described embodiment, when the prohibition area (or storage prohibition area) is set at the touch position, the player character 40 is caused to perform the attack motion, instead of the forward roll motion. However, in other embodiment, the player character 40 may be caused to perform neither the forward roll motion nor the attack motion.

In addition, in the present embodiment, the above-mentioned prohibition area is moved so as to follow the movement of the enemy character and the storage prohibition area is generated at the position where the enemy character has been present before the movement. In other embodiment, the above-mentioned prohibition area may be generated at the position of the enemy character in accordance with the touch operation on the enemy character by a user and the above-mentioned prohibition area may be held (at the position) until a predetermined time period has elapsed. In other words, it is not required that the prohibition area moves so as to follow the movement of the enemy character and it is only required that the prohibition area is generated in accordance with the touch operation by a user and held for the predetermined time period from the generation thereof.

In addition, in the present embodiment, the player character is caused to perform the motions such as the forward rolls and the attack in accordance with the touch operation. Specifically, in the case where the player character is caused to perform the forward rolls in accordance with the double-touch operation (operation of the two touches for the predetermined time period) and the prohibition area is set at the touch position, even when the double-touch is detected, the player character is caused not to perform the forward rolls but caused to perform the attack. In other embodiment, an operation by which a player designates a position may be different from an operation by which the player character is caused to perform the first motion. For example, when a pointer displayed on the screen is operated by using the cross switch 14a and the A button 14d is pressed, a position of the pointer may be supposed to be a position designated by a player. For example, when the B button 14e is pressed, the player character may be caused to perform the above-mentioned first motion. In a case where the prohibition area is set at the position designated by a player, even when the B button 14e is pressed, the player character may be caused not to perform the above-mentioned first motion. In other words, in other embodiment, when the first operation is performed onto the input device (input part), the player character may be caused to perform the first motion. In a case where the position on the screen, designated by a player, is present within the prohibition area, even when the above-mentioned first operation is detected, the player character may be caused not to perform the above-mentioned first motion (the first motion may be prohibited).

In addition, in the present embodiment, when a player touches the enemy character 41, the above-mentioned prohibition area is set and after the lapse of the predetermined time period, the prohibition area is caused to disappear. In other embodiment, timing at which the prohibition area is generated may be any timing. For example, the prohibition area may be previously set for the enemy character 41 and the prohibition area may be also moved in accordance with movement of the enemy character 41. In this case, the above-mentioned storage prohibition area is set in accordance with the movement of the enemy character 41 at a position where the enemy character 41 has been present before the movement (the prohibition area is held at the position where the enemy character 41 has been present before the movement). In addition, the prohibition area may be set for the enemy character 41 at predetermined timing, and when the enemy character 41 has moved, the prohibition area may be held at the position where the enemy character 41 has been present before the movement. In addition, for example, at timing at which a distance between the enemy character 41 and the player character 40 becomes shorter than a predetermined distance, the above-mentioned prohibition area may be set, or at a time point when the enemy character 41 is displayed on the screen, the above-mentioned prohibition area may be set. And the prohibition area may be held in accordance with the movement of the enemy character 41 at the position where the enemy character 41 has been present before the movement (the storage prohibition area may be set). In other words, at the time point when the distance between the enemy character 41 and the player character 40 becomes shorter than the predetermined distance, the above-mentioned prohibition area is set at the position of the enemy character 41. This can cause the player character 40 to be prohibited from performing the forward rolls toward the enemy character 41 and to perform the attack (continuous attack) against the enemy character 41 even in a case where the double-touch on the enemy character 41 is detected. In addition, in a case where the enemy character 41 moves in a state where the distance between the enemy character 41 and the player character 40 is shorter than the predetermined distance, the prohibition area is held at the position where the enemy character 41 has been present before the movement. This allows the game apparatus 10 to judge that the attack against the enemy character 41 has been performed and the game apparatus 10 to cause the player character 40 to perform the attack motion (motion of swishing the air) at the position where the enemy character 41 has been present before the movement.

In addition, in other embodiment, the time periods/period for which the prohibition area and/or the storage prohibition area are/is present (time periods/period from when the prohibition area and/or the storage prohibition area are/is set to when the prohibition area and/or the storage prohibition area disappear/disappears) may be set in accordance with kinds of the objects. For example, the time periods/period, for which the above-mentioned prohibition area and/or storage prohibition area are/is present, set for an object whose motion is fast may be shorter than those/that set for an object whose motion is slow.

In addition, the above-mentioned prohibition area and storage prohibition area may be of any shape and in any size, and a plurality of the above-mentioned prohibition areas and storage prohibition areas may be set for one object. For example, the prohibition area and the storage prohibition area may be of three-dimensional shapes. In addition, the shapes of the above-mentioned prohibition area and storage prohibition area may be set in accordance with kinds of the objects. For example, a shape of the prohibition area for an object which moves in a horizontal direction on the screen may be set to be a shape whose size in a horizontal direction on the screen is larger than that in a vertical direction on the screen.

In addition, until through the movement of the player character 40 and/or the enemy character 41, a positional relationship between the player character 40 and the enemy character 41 comes to satisfy a predetermined condition, the prohibition area may be held. For example, until other object (the wall object 43, a river object, a road object, etc.) comes to be present between the player character 40 and the enemy character 41, the prohibition area may be held. In addition, for example, until the player character 40 and the enemy character 41 come to be away from each other at a predetermined distance or more, the prohibition area or the like may be held. Further, in a case where the above-mentioned positional relationship satisfies the predetermined condition, no prohibition area or the like may be generated. For example, in a case where other object is present between the player character 40 and the enemy character 41, no prohibition area or the like may be generated.

In addition, in the present embodiment, the enemy character 41 is a character which is different from the player character operated by a player and is automatically operated by the game apparatus 10. In other embodiment, for example, in a versus beat'em-up game in which players fight against each other, a method for controlling the above-mentioned player character may be applied. For example, the above-mentioned player character 40 is supposed to be operated as a player character A operated by a first player and the above-mentioned enemy character 41 is supposed to be operated as a player character B operated by a second player, and the above-mentioned method may be applied. In other words, in a case where the player character A is moved or caused to attack the player character B in accordance with an operation performed by the first player, the prohibition area or the like may be set for the player character B. This allows the player character A to be operated as intended by the first player.

In addition, the prohibition area in the above-described embodiment may be replaced with a permission area. Here, the "permission area" is an area set at the position of the enemy character 41 and an area where the player character 40 is caused to attack the enemy character 41. When a player touches the permission area (or a storage permission area), the player character 40 may be caused to perform the attack motion. In other words, when the permission area is set at a position of a predetermined object (enemy character) and the predetermined object moves, the storage permission area may be set at a position where the predetermined object has been present before the movement. And only in a case where a position designated by a player is present in the permission area or the storage permission area, the player character may be caused to perform the attack motion.

In addition, in the present embodiment, the description is given with the hand-held game apparatus used as one example. However, in other embodiment, the above-mentioned method may be applied to a stationary game apparatus.

Figure 15:
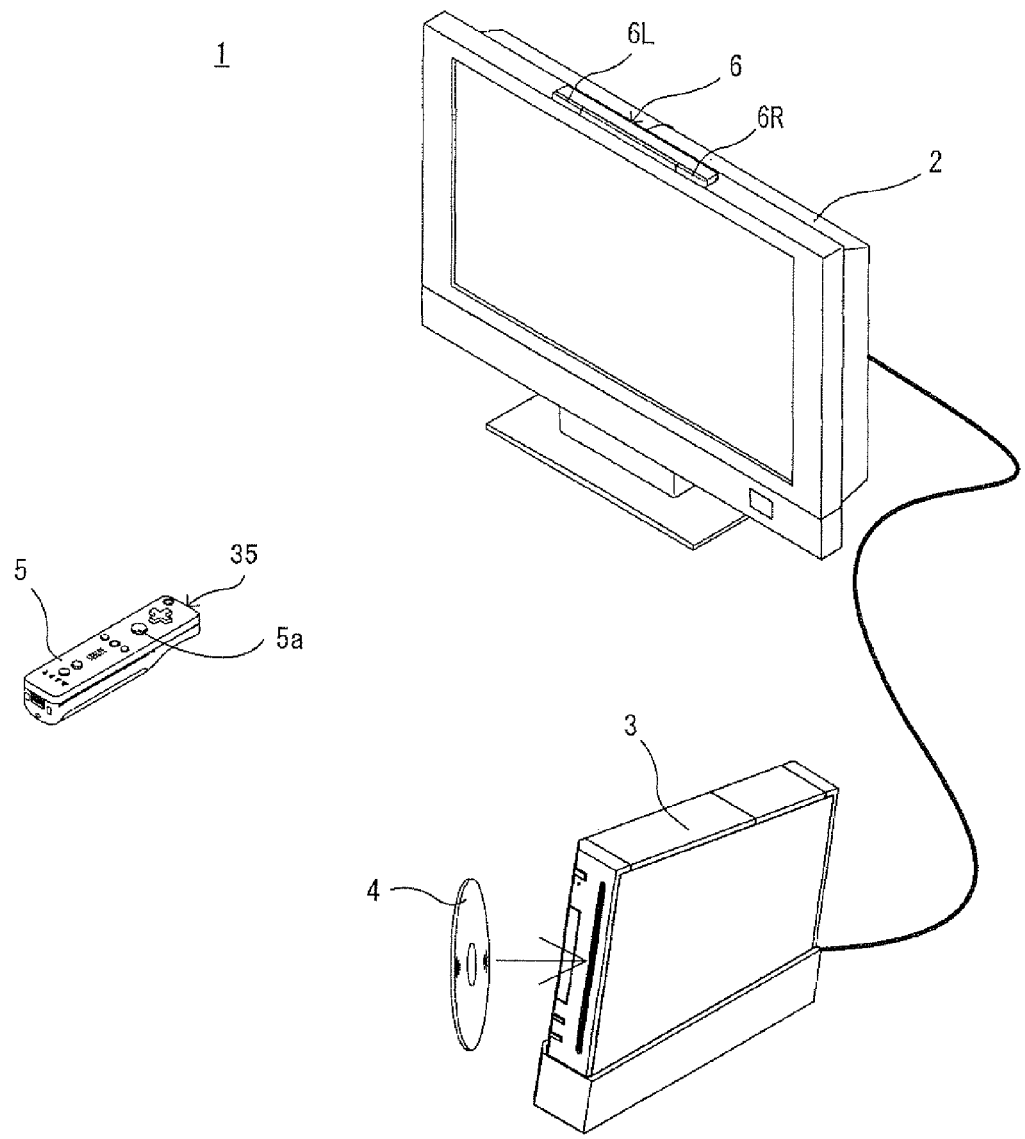
FIG. 15 is an external view illustrating a game system according to another embodiment.

For example, also in a game system shown in FIG. 15, the method for controlling the above-mentioned object may be applied. FIG. 15 is an external view illustrating a game system according to another embodiment. In FIG. 15, the game system 1 includes a television 2, a game apparatus 3, an optical disc 4, a controller 5, and a marker section 6. In the present system, the game apparatus 3 executes a game program stored in the optical disc 4 based on a game operation performed by using the controller 5. A user designates (points) a position on a television screen by using the controller 5. Specifically, the controller 5 is provided with an imaging information arithmetic section 35, and imaging means of the imaging information arithmetic section 35 receives infrared light from a marker 6R and a 6L of the marker section 6. The controller 5 analyzes image data obtained by the imaging means and calculates positions of the markers 6R and 6L, thereby calculating a position (a position on the television screen, designated by a user) pointed by a user. The pointed position is ideally a position at which a straight line spanning from a front end portion of the controller 5 in a longitudinal direction and the television screen intersects. In the above-described game system 1, the above-described method for controlling the object may be applied. For example, a user designates a predetermined position on the television screen by using the controller 5 and presses a button 5a of the controller 5, thereby operating an object displayed on the screen. In a case where the above-mentioned prohibition area is set at the designated position, the object may be prohibited from performing a predetermined motion. In a case where the above-mentioned prohibition area is not set at the designated position, the object may be caused to perform the predetermined motion.

In addition, in other embodiment, the above-described method may be applied to any information processing apparatus (for example, a PDA (Personal Digital Assistant), a mobile phone, etc.) having a display device and a touch panel and to a personal computer provided with a pointing device such as a mouse.

In addition, in other embodiment, the method for controlling the above-mentioned objects may be applied to a computer system structured by a terminal and a server which are connected to a network. For example, a position on a screen of the terminal operated by a user is designated by using an input device (for example, a mouse) of the terminal, whereby an operational object managed on the server may be controlled. In this case, the terminal transmits information indicating the position, designated via the network, to the above-mentioned server. On the other hand, the server manages the above-mentioned operational object and other objects and manages setting and holding of the above-mentioned prohibition area (or the storage prohibition area). The server may determine whether or not the above-mentioned prohibition area (or the storage prohibition area) is present at the designated position and the above-mentioned operational object may be caused to perform a predetermined motion in accordance with a determination result. In the above-described computer system, although the processes shown in FIG. 12 are performed on the server, a part of the processes shown in FIG. 12 may be executed on the terminal. For example, the touch detection process (the process of detecting the designated position) at step S1 and the motion determination process at step S2 may be executed on a side of the terminal, and a result of the motion determination may be transmitted to the server.

Further, in the present embodiment, the CPU core 21 of the game apparatus 10 executes the game program, whereby the processes in the above-described flow charts are performed. In other embodiment, a part or all of the above-described processes may be performed by a dedicated circuit included in the game apparatus 10.

While the above embodiments have been described in detail, the foregoing description is in all aspects illustrative and not restrictive. It is understood that numerous other modifications and variations can be devised without departing from the scope of the invention.

What is claimed is:

1. A non-transitory computer-readable storage medium storing computer readable instructions for use with a processing system that includes at least one processor, the processing system configured to control an operational object in a virtual space, the operational object set to be operated in accordance with input from an input device operable to designate a position on a screen of a display device, the stored instructions comprising instructions that are configured to:

detect, based on an output signal from the input device, a first position on the screen, which is designated by a user;

set a predetermined area based on an original position of a predetermined object in the virtual space, the predetermined object being different than the operational object;

hold the predetermined area for a predetermined period of time;

detect, based on an output signal from the input device, a first operation onto the screen;

cause the operational object to perform a first motion in accordance with the first operation; and perform a determination as to whether or not the detected first position is present in the predetermined area, wherein when the predetermined object is moved to a new position in the virtual space, the predetermined area is held, after movement of the predetermined object, at the original position where the predetermined object was before moving to the new position, and wherein when the determination is that the detected first position is within the predetermined area, the operational object is prohibited from performing the first motion, wherein the new position is outside the predetermined area.

2. The non-transitory computer-readable storage medium of claim 1, wherein the predetermined area is set based on an output signal from the input device when a designation to the predetermined object is detected.

3. The non-transitory computer-readable storage medium of claim 1, wherein the instructions are further configured to cause the operational object to perform a second motion different from the first motion when the determination is positive.

4. The non-transitory computer-readable storage medium of claim 3, wherein the instructions are further configured to detect a second operation different from the first operation onto the screen based on an output signal from the input device, and when the determination is positive cause the operational object to perform the second motion in accordance with the first operation or the second operation.

5. The non-transitory computer-readable storage medium of claim 4, wherein when the determination is negative the first motion is performed in accordance with the first operation.

6. The non-transitory computer-readable storage medium of claim 4, wherein the first operation is associated with a predetermined operation performed onto the detection device that is repeatedly detected over a predetermined detection period.

7. The non-transitory computer-readable storage medium of claim 6, wherein the predetermined period of time is longer than the predetermined detection period.

8. The non-transitory computer-readable storage medium of claim 1, wherein the stored instructions further comprise instructions that are configured to:
when the predetermined object is moved to the new position, create a second predetermined area in accordance with the predetermined object at the new position;
determine whether or not the detected first position is present in any of either the predetermined area or the second predetermined area.

9. The non-transitory computer-readable storage medium of claim 1, wherein when a positional relationship between the operational object and the predetermined object satisfies a predetermined condition the predetermined area is not set.

10. The non-transitory computer-readable storage medium of claim 1, the stored instructions further comprise instructions that are configured to remove the predetermined area when through the movement of the operational object and/or the predetermined object, a positional relationship between the operational object and the predetermined object comes to satisfy a predetermined condition.

11. The non-transitory computer-readable storage medium of claim 10, wherein the predetermined area is removed when a third object different from the operational object and from the predetermined object is between the operational object and the predetermined object.

12. The non-transitory computer-readable storage medium of claim 1, wherein the hold period is set in accordance with a kind of the predetermined object.

13. The non-transitory computer-readable storage medium of claim 1, the stored instructions further comprise instructions that are configured to automatically move the predetermined object.

14. The non-transitory computer-readable storage medium of 3, wherein
the first motion is a non-attack motion which the operational object is caused to perform, and
the second motion is an attack motion that is performed against the predetermined object.

15. The non-transitory computer-readable storage medium of 1, wherein a shape of the predetermined area, a size of the predetermined area, or a number of the predetermined areas is set in accordance with a kind of the predetermined object.

16. A non-transitory computer-readable storage medium having stored therein an object control program executed by a computer that has at least one processor in an object control apparatus for controlling an operational object in a virtual space, the operational object operated in accordance with input from a user provided via an input device operable to designate a position on a screen of a display device, the object control program comprising instructions that are configured to:
detect, based on an output signal from the input device, a first position on the screen, which is designated by a user;
set a predetermined area in an original position of a predetermined object in the virtual space, which is different from the operational object;
hold the predetermined area until a predetermined hold period has elapsed;
determine whether or not the first position is present in the predetermined area; and
cause the operational object to perform a first motion in accordance with a predetermined operation onto the input device when the first position is present in the predetermined area,
wherein the predetermined area is held at the original position where the predetermined object has been present before movement to a new position that is outside the predetermined area even in a case where the predetermined object has moved in the virtual space.

17. An object control system for controlling an operational object in a virtual space, the operational object operated in accordance with input of a user provided to an input device operable to designate a position on a screen of a display device, the system comprising:
a processing system that includes at least one processor, the processing system configured to:
detect, based on an output signal from the input device, a position on the screen, which is designated by a user;
set a predetermined area in a position of a predetermined object in the virtual space, the predetermined object being different from the operational object;
hold the set predetermined area until a predetermined hold period has elapsed;
detect, based on an output signal from the input device, a first operation onto the screen;
cause the operational object to perform a first motion in accordance with the first operation; and
determine whether or not the detected position is present in the held predetermined area,
wherein when the predetermined object is moved to a new position in the virtual space, the predetermined area is held, after movement of the predetermined object, at the position where the predetermined object was before moving to the new position, and
wherein the operational object is prohibited from performing the first motion when the detected position is determined to be present within the predetermined area,
wherein the new position is outside the predetermined area.

18. A method for use with a processing system that includes at least one processor, the processing system configured to control an operational object in a virtual space, the operational object set to be operated in accordance with input from an input device operable to designate a position on a screen of a display device, the method comprising:

detecting, based on an output signal from the input device, an input position on the screen, which is designated by a user;
setting a predetermined area based on a position of a predetermined object in the virtual space, the predetermined object being different than the operational object;
holding the predetermined area for a predetermined period of time;
detecting, based on an output signal from the input device, a first operation onto the screen;
causing the operational object to perform a first motion in accordance with the first operation; and
performing, via the processing system, a determination as to whether or not the detected input position is present in the predetermined area,
wherein when the predetermined object moves to a new position in the virtual space, the predetermined area is held, after movement of the predetermined object, at the position where the predetermined object was before moving to the new position, and
wherein when the determination is that the input position is within the predetermined area, the operational object is prohibited from performing the first motion,
wherein the new position is outside the predetermined area.

* * * * *